UNITED STATES PATENT OFFICE.

NATHANIEL HAYWARD, OF COLCHESTER, CONNECTICUT.

IMPROVEMENT IN THE MANUFACTURE OF INDIA-RUBBER.

Specification forming part of Letters Patent No. 14,657, dated April 15, 1856.

*To all whom it may concern:*

Be it known that I, NATHANIEL HAYWARD, of Colchester, in the county of New London and State of Connecticut, have invented or discovered an improvement in the art or process of cementing and uniting surfaces of vulcanized india-rubber with each other; and I do hereby declare that the following is a full and exact specification of the same, wherein I have set forth the nature and principles of my said improvement and the various details of my said process by which it may be distinguished from all others for a similar purpose, together with such parts as I claim and desire to have secured to me by Letters Patent.

My invention or discovery consists in the mode of preparing and cementing vulcanized india-rubber fabrics for various uses in the arts.

It is well known among manufacturers of india-rubber goods that valcanized india-rubber, unlike native rubber, cannot be made to adhere to other surfaces or to other pieces of vulcanized rubber. It has long been a desire to accomplish such a result, because there are a great number and variety of articles which can be best made by the union of two different kinds of rubber, prepared at different times and in different manners, or of two or more pieces of the same quality of rubber united after they have once been vulcanized. Two pieces of native rubber, when freshly cut with smooth surfaces, may be made to adhere closely by simple pressure; but no amount of pressure will cause two surfaces of vulcanized india-rubber to adhere, nor will the common cements, when applied to such surfaces, cause them to adhere for any useful purposes. I have been experimenting for years to accomplish this result and have discovered a mode of effecting this, which can be applied to most of the fabrics and forms in which cemented rubber is required.

I will describe the mode in which I apply heels to boots or shoes, and this will illustrate my improved process.

The boot-heels are made of what is called "hard gum"—*i. e.*, rubber vulcanized to such a degree that the compound is deprived of most of its elasticity and the rubber is harder than usual, sometimes being as hard as horn. The sole of the rubber-boot is made of softer vulcanized rubber, and it is necessary that the heel should be made by a different process and afterward affixed to the sole. The heel being made of hard gum, the upper part, or the part to be joined to the sole, is roughened by any proper tool, and then a cement is applied to it in one two, or three coats, each coat to be partially dried before the succeeding one is applied. The cement which I prefer is prepared as hereinafter described; but any cement or compound of india-rubber may be used, it being essential that the cement should be of a compound capable of being vulcanized. My cement is prepared by grinding native rubber between rollers, so as to make it soft and plastic. It is then mixed with sulphur, litharge, plaster-of-paris, and camphene in the proportions of one pound of rubber, one quarter of a pound of plaster-of-paris, one quarter of a pound of litharge, two ounces of sulphur, and half a pint of camphene. This cement is to be applied to the heel in one, two, or three coats, according to the thickness of the coat, the whole not to be more than the thickness of any ordinary wafer. The heel is then placed in the usual heater and heated from one to two hours by heat gradually raised from 220° to 250° Fahrenheit, these degrees of heat being found the best in working, although I do not limit myself to the range specified, as higher or lower degrees of heat can be used. The result is that the cement becomes partially vulcanized and adheres firmly to the heel, while the outer surface of it remains tacky and sticky, so that it will adhere very firmly to cloth or other surfaces. The boot is prepared in the usual manner, and is placed upon the last ready to be vulcanized. The heel prepared as above is then affixed to the sole by pressure, and the boot is placed in the heater and heated in the ordinary manner as high as 275°. The result is that the boot and the sole thereof are vulcanized, and the cement which is between the sole and the heel becomes, in this process of second heating, thoroughly and firmly united with the heel and the sole.

In cementing together two pieces of vulcanized rubber for any purpose the usual practice has been to take a cement of rubber dissolved in camphene and apply it to the two surfaces. This cement, when dry, causes a slight adhesion of the two surfaces, but not sufficient for any useful purpose when much strength is required.

My mode is to take the pieces to be cemented, pare them smoothly with a proper bevel for the two edges or surfaces to be united, so that they will match accurately, then by applying the cement in the same manner described hereinbefore in the case of the boot-heels and exposing the whole again to the vulcanizing process, as before described, the operation is completed.

The cement or compound which is to unite the two surfaces may be made of any of the ordinary compounds of india-rubber which are susceptible of being vulcanized, and the quantity of the cement used in uniting two surfaces may be raised according to the judgment or wishes of the manufacturer. It is, however, better, in submitting the product to the vulcanizing process a second time, that the heat should be carried some 10° to 20° higher than in using the process, &c., for the first time.

What I claim as my invention, and desire to have secured to me by Letters Patent, is—

The improved process hereinabove described of cementing and uniting one piece of vulcanized rubber with another piece of rubber either vulcanized or in a state capable of being vulcanized.

NATHANIEL HAYWARD.

Witnesses:
EZRA LINCOLN,
L. A. SNEDEN.